United States Patent [19]

Robeson et al.

[11] 4,380,598
[45] Apr. 19, 1983

[54] FLAME RETARDANT POLYARYLATE COMPOSITIONS

[75] Inventors: Lloyd M. Robeson, Whitehouse Station; Markus Matzner, Edison, both of N.J.

[73] Assignee: Union Carbide Corporation, Danbury, Conn.

[21] Appl. No.: 233,693

[22] Filed: Feb. 12, 1981

[51] Int. Cl.³ ............................................... C08K 5/42
[52] U.S. Cl. .................................... 524/163; 524/157; 524/159; 524/161; 524/162; 524/164; 524/371; 524/394
[58] Field of Search ................... 260/45.7 SF, 45.9 E, 260/45.9 KA, 45.95 G; 525/397, 437, 444; 524/159, 161, 162, 163, 164

[56] References Cited

U.S. PATENT DOCUMENTS

| | | | |
|---|---|---|---|
| 3,745,141 | 7/1973 | Bonnard et al. | 525/397 |
| 3,775,367 | 11/1973 | Nouvertne | 260/45.7 SF |
| 3,940,366 | 2/1976 | Mark | 524/164 |
| 3,971,756 | 7/1976 | Bialous et al. | 260/45.7 SF |
| 4,171,330 | 10/1979 | Kyo et al. | 260/45.7 RL |
| 4,211,687 | 7/1980 | Salee | 260/45.7 RL |
| 4,246,381 | 1/1981 | Robeson | 525/444 |

*Primary Examiner*—John Kight, III
*Assistant Examiner*—R. A. White
*Attorney, Agent, or Firm*—Donald M. Papuga

[57] ABSTRACT

Described herein are flame retardant molding compositions comprising a blend of a polyarylate derived from a dihydric phenol and an aromatic dicarboxylic acid and a flame retardant additive which is a metal salt of an aromatic sulfonic acid. The composition may additionally contain one or more thermoplastic polymers.

55 Claims, No Drawings

FLAME RETARDANT POLYARYLATE COMPOSITIONS

This invention is directed to a flame retardant molding composition comprising a blend of a polyarylate derived from a dihydric phenol and an aromatic dicarboxylic acid and a flame retardant additive which is a metal salt of an aromatic sulfonic acid. The composition may additionally contain one or more thermoplastic polymers.

Polyarylates are aromatic polyesters derived from a dihydric phenol, particularly 2,2-bis(4-hydroxyphenyl)-propane also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

However, in many instances, due to use of such articles by consumers, it is required that the articles be flame resistant or flame retardant. Unmodified polyarylates exhibit favorable flammability ratings necessary for certain end-use applications. However, under certain stringent conditions of use a polyarylate exhibiting increased flame retardance is desirable.

Additionally, in many applications, the polyarylate is blended with one or more thermoplastic polymers having lower flammability ratings, thus yielding a blend with an unsatisfactory flammability rating. Therefore, the utilization of a compatible and effective flame retardant is desirable in such polyarylate blends.

It has now been found that polyarylates, as well as polyarylates blended with one or more thermoplastic polymers, are rendered flame retardant by admixing therewith a flame retarding amount of a metal salt of an aromatic sulfonic acid.

DESCRIPTION OF THE INVENTION

According to the present invention there is provided a flame retardant molding composition comprising a blend of: a polyarylate derived from a dihydric phenol and an aromatic dicarboxylic acid and a flame retarding amount of a metal salt of an aromatic sulfonic acid.

The flame retardant molding composition may also comprise a blend of:

(a) a polyarylate derived from a dihydric phenol and at least one aromatic dicarboxylic acid,
(b) a flame retarding amount of a metal salt of an aromatic sulfonic acid, and optionally
(c) at least one thermoplastic polymer.

The thermoplastic polymers suitable for use herein include an aromatic polyester, an aromatic polycarbonate, a styrene polymer, an alkyl acrylate, a polyurethane, a vinyl chloride polymer, a poly(aryl ether), a copolyetherester block polymer, a polyhydroxyether, or a polyamide.

The polyarylate is used in the blend in amounts of from about 20 to about 99.95, preferably from about 40 to about 99.80 parts by weight; the flame retardant additive is used in amounts of from about 0.05 to about 10, preferably from about 0.1 to about 2.0 parts by weight, and when used, the thermoplastic polymer in amounts of from about 5 to about 80, preferably from about 10 to about 50, parts by weight.

The Flame Retardant Additive

The metal salt of an aromatic sulfonic acid flame retardant additive which may be used in this invention is selected from metal salts of sulfonic acids of aromatic sulfones, metal salts of cycloaliphatically substituted aromatic sulfonic acids, metal salts of heterocyclic aromatic sulfonic salts, metal salts of sulfonic acids of aromatic ketones, metal salts of either monomeric or polymeric aromatic sulfonic acids, metal salts of either monomeric or polymeric aromatic ether sulfonic acids, metal salts of momomeric and polymeric carboxyl or ester substituted aromatic sulfonic acids, metal salts of either monomeric or polymeric phenol ester sulfonic acids, metal salts of sulfonic acids of aromatic sulfoxides, and mixtures thereof. These sulfonic acids may additionally be substituted with electron withdrawing radicals such as halo-, nitro-, trihalomethyl and cyano. The metal is selected from an alkali or an alkaline earth metal, preferably sodium, potassium or calcium. These metal salts are well known in the art and are described in, for example, U.S. Pat. Nos. 3,909,490; 3,917,559; 3,916,167; 3,926,908; 3,940,366; 3,951,910; 3,953,396; 3,953,399; 3,933,734; and 3,978,024.

The preferred flame retardant additives are of the following formula:

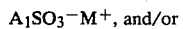

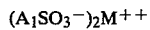

wherein $A_1$ is an aromatic monomeric or polymeric radical, $M^+$ is an alkali metal ion and $M^{++}$ is an alkaline earth metal ion. The aromatic radical may be substituted or unsubstituted and should contain at least 6 carbon atoms. The preferred substituents are electron withdrawing radicals such as halo-, trihalomethyl or cyano, preferably halo- selected from chlorine, bromine or fluorine. Preferably, $A_1$ is selected from:

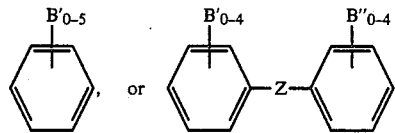

wherein Z is selected from a direct bond, O, CO, S, $SO_2$ or $OSO_2$ and B' and B" are independently chlorine, bromine, fluorine, trihalomethyl, cyano or nitro.

The preferred flame retardant additives are of the following formula:

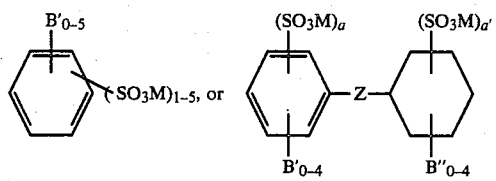

wherein M, B', B", and Z are as previously defined and a and a' are independently 0–4 with the proviso that at least one of a or a' is 1.

The most preferred flame retardant additives are of the following formula:

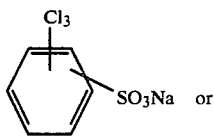

or

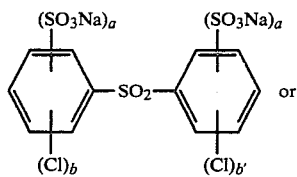

or

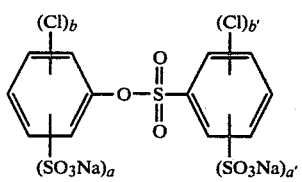

wherein a, a', b and b' are independently 0 to 4 with the proviso that at least one of a or a' and b or b' is 1.

The metal salts of the aromatic sulfonic acids may be used together with other flame retardant additives, such as a metal salt of aliphatic and olefinic sulfonic acids as described in U.S. Pat. No. 3,931,000, inorganic phosphates or a halogen source, such as an inorganic halide, or halogenated alkali metal salts or alkaline earth metal salts of aliphatic, aromatic or cycloaliphatic carboxylic or sulfonic acids. The halogenated alkali metal salts or alkaline earth metal salts are known in the art and are described, for example, in U.S. Pat. No. 4,104,253. Also, halogenated aromatic compounds may be included, such as decabromodiphenyl oxide, phosphate esters, and the like.

Polyarylates

The polyarylates of this invention are derived from a dihydric phenol and at least one aromatic dicarboxylic acid.

A particularly desirable dihydric phenol is of the following formula:

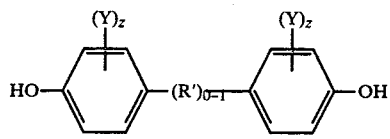

wherein Y is selected from alkyl groups of 1 to 4 carbon atoms, chlorine or bromine, each z, independently, has a value of from 0 to 4, inclusive, and R' is a divalent saturated or unsaturated aliphatic hydrocarbon radical, particularly an alkylene or alkylidene radical having from 1 to 3 carbon atoms, or a cycloalkylidene or cycloalkylene radicals having up to and including 9 carbon atoms. The preferred dihydric phenol is bisphenol-A. The dihydric phenols may be used individually or in combination.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

Preferably, the polyarylates used in this invention are prepared by the process described in U.S. patent application Ser. No. 189,561, now U.S. Pat. No. 4,321,355, filed Sept. 23, 1980, in the names of L. M. Maresca, et al. and titled "Improved Process For Preparing Polyarylates". This application describes an improved process for preparing a polyarylate having a reduced viscosity of from about 0.5 to greater than 1.0 dl/gm which process comprises the following steps:

(a) reacting an acid anhydride derived from an acid containing from 2 to 8 carbon atoms with at least one dihydric phenol to form the corresponding diester; and (b) reacting said diester with at least one aromatic dicarboxylic acid at a temperature sufficient to form the polyarylate, wherein the improvement comprises removing residual acid anhydride, after formation of the dihydric phenol diester, so that its concentration is less than about 1500 parts per million.

Thermoplastic Polymers

The thermoplastic polymers suitable for use in this invention are selected from the group consisting of a polyester polymer, an aromatic polycarbonate, a styrene polymer, an alkyl acrylate polymer, a polyurethane, a vinyl chloride polymer, a poly(aryl ether), a copolyetherester block polymer, a polyhydroxyether, a polyamide or combinations thereof.

A. Polyesters

The polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

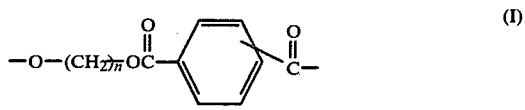

wherein n is an integer of from 2 to 4.

The preferred polyester is poly(ethylene terephthalate).

Also contemplated herein are the above polyesters with minor amounts, e.g., from 0.5 to about 2 percent by weight, of units derived from aliphatic acids and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

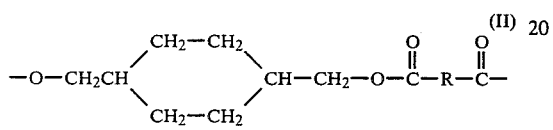

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids indicated by R in formula II, are isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present, such as in 1,4- or 1,5-naphthalenedicarboxylic acids. The preferred dicarboxylic acids are terephthalic acid or a mixture of terephthalic and isophthalic acids.

A preferred polyester may be derived from the reaction of either the cis- or trans-isomer (or a mixture thereof) of 1,4-cyclohexanedimethanol with a mixture of isophthalic- and terephthalic acids. These polyesters have repeating units of the formula:

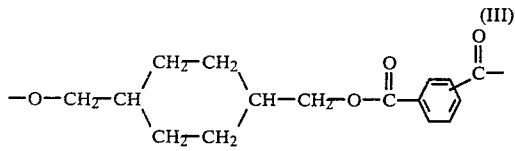

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

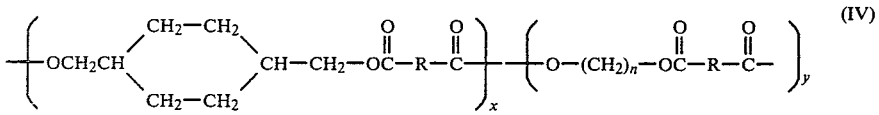

wherein the cyclohexane ring is selected from the cis- and trans-isomers thereof, R is as previously defined, n is an integer of 2 to 4, the x units comprise from about 10 to about 90 percent by weight and the y units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

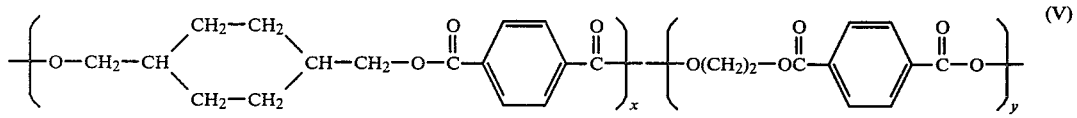

wherein x and y are as previously defined.

The polyester as described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23°–30° C.

B. Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2-(3,5,3',5'-tetrabromo-4,4'-dihydroxydiphenyl)propane, (3,3'-dichloro-4,4'-dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters, or with a dibasic acid in the event a carbonate copolymer or inter-polymer rather than a homopolymer is desired for use in the preparation of the aromatic carbonate polymer.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(chloronaphthyl)carbonate, etc. or mixtures thereof. The haloformates suitable for use herein include bis-haloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared in a one-phase (homogeneous solution) or two-phase (interfacial) systems when phosgene, or a haloformate are used. Bulk reactions are possible when the diarylcarbonate precursors are used.

Also, aromatic polyester carbonates may be used. These are described in, for example, U.S. Pat. No. 3,169,121. The preferred polyester carbonate results from the condensation of phosgene, terephthaloyl chloride, isophthaloyl chloride with bisphenol-A and a small amount of p-tertbutylphenol.

C. Styrene Resin

The styrene resins suitable for use herein are ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

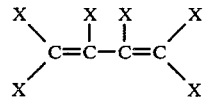

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

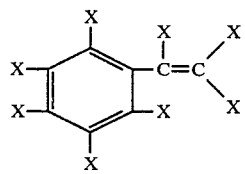

wherein X is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, α-methylstyrene, α-methyl vinyltoluene, α-chlorostyrene, α-bromostyrene, dichlorostyrene, dibromostyrene, tetra-chlorostyrene, mixtures thereof, and the like. The preferred monovinylaromatic hydrocarbons used are styrene and/or α-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The acrylonitrile, substituted acrylonitrile, or acrylic acid esters are described generically by the following formula:

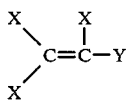

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

D. Poly (Alkyl Acrylate) Resin

The poly (alkyl acrylate) resin which may be used herein includes a homopolymer of methyl methacrylate (i.e., polymethyl methacrylate) or a copolymer of methyl methacrylate with a vinyl monomer (e.g., acrylonitrile, N-allylmaleimide, vinyl chloride or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

E. Polyurethanes

The thermoplastic polyurethanes which may be used herein are described in, for example, U.S. Pat. No. 3,214,411. Particularly useful polyester resins used as starting materials for the thermoplastic polyurethanes are those produced from adipic acid and a glycol having at least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed such that the final water content is from about 0.01 to about 0.2%.

Any suitable glycol may be used in the reaction with the adipic acid such as, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol, and the like. In addition to the glycols, a small amount of trihydric alcohol of up to about 1% may be used, such as trimethylolpropane, glycerol, hexanetriol, and the like. The resulting hydroxyl polyester has a molecular weight of at least about 600, a hydroxyl number of from about 25 to about 190 and preferably between about 40 and about 60, and acid number of between about 0.5 and about 2 and a water content of 0.01 to about 0.2%.

The diisocyanates which may be used in preparing the polyurethanes include ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2'-diphenylmethane diisocyanate, 2,2-diphenylpropane-4,4'diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, pentamethylene diisocyanate, 1-chlorobenzene-2,4-diisocyanate, furfurylidene diisocyanate, and the like.

Any suitable chain extending agent having active hydrogen containing groups reactive wih isocyanate groups may be used, such as diols, including ethylene glycol, propylene glycol, 1,4-butanediol, butenediol, butynediol, xylylene glycols, amylene glycols, 1,4-phenylene-bis-β-hydroxy ethyl ether, 1,3-phenylene-bis-β-hydroxy ethyl ether, bis-(hydroxy-methyl-cyclohexane), hexanediol, and the like; diamines, including ethylene diamine, cyclohexylene diamine, phenylene diamine, tolylene diamine, xylylene diamine, 3,3'-dichlorobenzidine, 3,3'-dinitrobenzidine and the like; alkanol amines such as ethanol amine, aminopropyl alcohol, 2,2-dimethyl propanol amine, 3-aminocyclohexyl alcohol, p-aminobenzyl alcohol, and the like.

If desired, a small amount of polyfunctional material may be utilized. This polyfunctional chain extender, however, should not be present in an amount greater than about 1% by weight. Any suitable polyfunctional compound may be used in such as glycerol, trimethylolpropane, hexanetriol, pentaerythritol, and the like.

The polyester, the organic diisocyanate and the chain extender may be individually heated to a temperature of from about 60° to about 135° C. and then the polyester and chain extender are substantially simultaneously mixed with the diisocyanate. to increase the rate of reaction, any suitable catalyst may be used, such as tertiary amines and the like. Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like. Polyesters based on ε-caprolactone are also preferred.

A polyether may be used instead of the polyester in the preparation of the thermoplastic polyurethanes and preferably, polytetramethylene glycol having an average molecular weight between about 600 and about 2000. Other polyethers, such as polypropylene glycol, polyethylene glycol and the like may be used providing their molecular weight is above about 600.

The thermoplastic polyurethanes are described in, for example, U.S. Pat. Nos. 2,621,166, 2,729,618, 3,214,411, 2,778,810 and 3,012,992.

F. Vinyl Chloride Polymers

The vinyl chloride polymers suitable for use herein are polyvinyl chloride and copolymers of vinyl chloride with olefinically unsaturated polymerizable compounds which contain at least 80 percent by weight of vinyl chloride incorporated therein.

Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and α-alkyl-acrylate and their alkyl esters, amides and nitriles, methacrylic acid, maleic acid or anhydride, methyl methacrylate, ethyl acrylate, 2-ethylhexylacrylate, butyl methacrylate, 2-hydroxypropyl acrylate, acrylamide, N-methyl acrylamide, acrylonitrile and methacrylonitrile, aromatic vinyl compounds, such as styrene and vinyl naphthalene and olefinically unsaturated hydrocarbons such as ethylene, bicyclo-[2,2,1]-hept-2-ene and bicyclo-[2,2,1]-hepta-2,5-diene. Polymerized vinyl acetate may be hydrolyzed to provide vinyl alcohol moieties in the polymer.

These vinyl chloride polymers are well known in the art and can be prepared by the usual methods of solution, emulsion, suspension, bulk or mass polymerization.

Vinyl chloride polymers which have molecular weights of from about 40,000 to about 60,000 are preferred.

G. Poly(aryl ether)s

The poly(aryl ether) resin components suitable for use herein are linear, thermoplastic polyarylene polyether polysulfones, wherein the arylene units are interspersed with ether and sulfone linkages. These resins may be obtained by reaction of an alkali metal double salt of a dihydric phenol and a dihalobenzenoid compound, either or both of which contain a sulfone or ketone linkage, i.e., —SO$_2$— or —CO— between arylene groupings, to provide sulfone or ketone units in the polymer chain in addition to arylene units and ether units. The polysulfone polymer has a basic structure comprising recurring units of the formula:

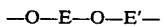

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. Nos. 3,264,536, and 4,108,837, for example.

The residuum of a dihydric phenol, E is derived from dinuclear phenols having the structure:

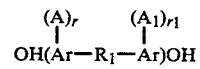

Wherein Ar is an aromatic group and preferably is a phenylene group, A and A$_1$ may be the same or different inert substituent groups, such as alkyl groups having from 1 to 4 carbon atoms, halogen atoms, i.e., fluorine, chlorine, bromine or iodine, or alkoxy radicals having from 1 to 4 carbon atoms, r and r$_1$ are integers having a value of from 0 to 4, inclusive, and R$_1$ is representative of a bond between aromatic carbon atoms as in dihydroxydiphenyl, or is a divalent radical, including, for example, CO, O, S, S—S, SO$_2$ or a divalent organic hydrocarbon radical, such as alkylene, alkylidene, cycloalkylene, cycloalkylidene, or the halogen, alkyl, aryl substituted alkylene, alkylidene, cycloalkylene, and cycloalkylidene radicals as well as alkarylene and aromatic radicals and a ring fused to both Ar groups.

Typical preferred polymers have recurring units having the following structure:

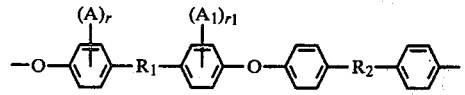

as described in U.S. Pat. No. 4,108,837, supra. In the foregoing formula A and A$_1$ can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and r$_1$ are integers having a value of from 0 to 4, inclusive. Typically, R$_1$ is representative of a bond between aromatic carbon atoms or a divalent connecting radical and R$_2$ represents sulfone, carbonyl, or sulfoxide. Preferably, R$_1$ represents a bond between aromatic carbon atoms. Even more preferred are the thermoplastic polysulfones of the above formula wherein r and r$_1$ are zero, R$_1$ is a divalent connection radical of the formula

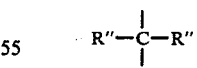

wherein R'' is selected from lower alkyl, aryl, and the halogen substituted groups thereof, preferably methyl and R$_2$ is a sulfone group.

The poly(aryl ether)s have a reduced viscosity of from about 0.4 to about 1.5 dl/g as measured in an appropriate solvent at an appropriate temperature depending on the particular polyether, such as in methylene chloride at 25° C.

The preferred poly(aryl ether)s have repeating units of the formula:

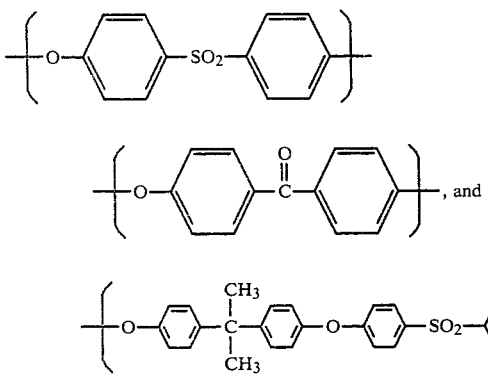

H. Copolyetherester Block Copolymer

The copolyetheresters suitable for use herein are well known in the art and are described in, for example, U.S. Pat. Nos. 3,784,520 and 3,766,146.

The polyester comprises a multiplicity of recurring intralinear long chain and short chain ester units connected head-to tail through ester linkages, said long chain ester units being represented by the following structure:

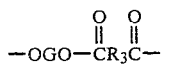   (a)

and said short chain ester units being represented by the following structure:

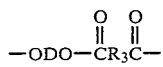   (b)

wherein G is a divalent radical remaining after removal of terminal hydroxy groups from a poly(alkylene oxide) glycol having a molecular weight of from about 400 to about 3500; D is a divalent radical remaining after removal of hydroxyl groups from a low molecular weight diol having a molecular weight of less than about 250; and $R_3$ is a divalent radical remaining after removal of carboxyl groups from a dicarboxylic acid having a molecular weight of less than about 300, with the proviso that the short chain ester units constitute from about 25 to about 65% by weight of the copolyester, at least about 70% of the $R_3$ groups are 1,4-phenylene radicals, at least about 70% of the D groups are 1,4-butylene radicals, and the sum of the percentages of the $R_3$ groups which are not 1,4-phenylene radicals and of the D groups which are not 1,4-butylene radicals do not exceed about 30%.

The term "long chain ester units" as applied to units in a polymer chain refers to the reaction product of a long chain glycol with a dicarboxylic acid. Such "long chain ester units", which are a repeating unit in the copolyesters herein correspond to the Formula (a) above. The long chain glycols may be poly(alkylene oxide) glycols having a molecular weight between about 400 and about 3500, preferably between about 600 and about 2000. Copolyesters prepared from poly(alkylene oxide) glycols having a molecular weight between about 600 to about 2000 are preferred.

The term "short chain ester units" as applied to units in a polymer chain refers to low molecular weight compounds or polymer chain units having molecular weight of less than about 550. They are made by reacting a low molecular weight diol (below about 250) with a dicarboxylic acid to form ester units represented by Formula (b) above.

Included among the low molecular weight diols (other than 1,4-butanediol) which react to form short chain ester units are acyclic, alicyclic and aromatic dihydroxy compounds. Preferred are diols with from 2 to 15 carbon atoms, such as ethylene, propylene, isobutylene, tetramethylene, pentamethylene, 2,2-dimethyltrimethylene, hexamethylene and decamethylene glycols, dihydroxy cyclohexane, cyclohexanedimethanol, resorcinol, hydroquinone, 1,5-dihydroxy naphthalene, etc. Especially preferred are aliphatic diols containing from 2 to 8 carbon atoms. Included among the bisphenols which can be used are bis(p-hydroxy)diphenyl, bis(p-hydroxphenyl)methane, and bis(p-hydroxphenyl)propane.

Dicarboxylic acids (other than terephthalic acid) which are reacted with the foregoing long chain glycols or low molecular weight diols to produce the copolyesters are aliphatic, cycloaliphatic or aromatic dicarboxylic acids.

Representative aliphatic and cycloaliphatic acids which may be used are sebacic acid, 1,3-cyclohexane dicarboxylic acid, 1,4-cyclohexane dicarboxylic acid, adipic acid, glutaric acid, succinic acid, carbonic acid, cyclopentanedicarboxylic acid, decahydro-1,5-naphthylene dicarboxylic acid and 4,4-bicyclohexyl dicarboxylic acid. Preferred cycloaliphatic acids are cyclohexane-dicarboxylic acids.

Representative aromatic dicarboxylic acids which may be used are phthalic, terephthalic and isophthalic acids, substituted dicarboxy compounds with two benzene nuclei, such as bis(p-carboxyphenyl)methane and p-carboxyphenyl/oxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polymer is terephthalic acid and at least about 70 mole percent of the low molecular weight diol incorporated into the polymer is 1,4-butanediol. Thus, at least 70% of the $R_3$ groups in Formulae (a) and (b) above are 1,4-phenylene radicals and at least about 70% of the D groups in Formula b above are 1,4-butylene radicals.

The most preferred copolyesters are those prepared from dimethylterephthalate, 1,4-butanediol and poly(tetramethylene oxide) glycol having a molecular weight of from about 600 to about 1500.

The copolyetheresters described herein can be made conveniently by a conventional ester interchange reaction by methods well known in the art and as described in, for example, U.S. Pat. Nos. 3,784,520 and 3,766,146.

I. Polyhydroxyether

The thermoplastic polyhydroxyethers which may be used herein have the following general formula

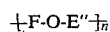

where F is the radical residuum of a dihydric phenol, $D''$ is a radical residuum of an epoxide selected from mono- and diepoxides and which contain from 1 to 2 hydroxyl groups, an n is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

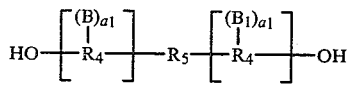

wherein $R_4$ is an aromatic divalent hydrocarbon radical, such as naphthylene and phenylene with phenylene being preferred, B and $B_1$ may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, a and $a_1$ are independently integers of 0 to 4, R' is alkylene, alkylidene, cycloalkylene or a saturated divalent group. Particularly preferred are dihydric polynuclear phenols having the general formula:

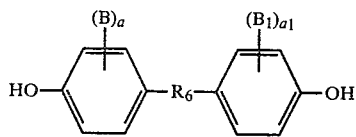

wherein B, $B_1$, a and $a_1$ are as previously defined, and $R_6$ is an alkylene or alkylidene group, preferably having from 1 to 3 carbon atoms, cycloalkylene or cycloalkylidene having 6 to 12 carbon atoms.

Diepoxides useful for the preparation of polyhydroxyethers may be represented by repeating units of the following formula

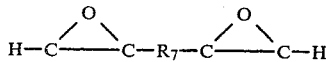

wherein $R_7$ is representative of a bond between adjacent carbon atoms or a divalent organic radical such as an aliphatic, aromatic, cyclic, heterocyclic or acyclic arrangement of atoms.

Other diepoxides which can be mentioned include those wherein two oxirane groups are linked through an aromatic ether, i.e., compounds having the grouping

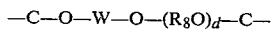

wherein $R_8$ is a divalent organic radical, W is a divalent aromatic radical residuum of a dihydric phenol, such as those listed above in the description of dihydric phenols, and d is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,294,747; and 3,277,051.

J. Polyamides

The polyamides as utilized herein include synthetic linear polyamides which can be prepared from polyamide-forming monomers such as monoaminocarboxylic acids, their amide-forming derivatives, or from suitable diamines and suitable dicarboxylic acids or amide-forming derivatives of these compounds. The polyamides produced having recurring amide groups as an integral part of the main polymer chain and the recurring intralinear carboamide groups in these polyamides are separated by hydrocarbon groups containing at least two carbon atoms. Synthetic linear polyamides which can be used according to the method of this invention are all those of the nylon type having a reduced viscosity between about 0.4 and about 3.5 as measured in suitable solvents, such as formic acid, trifluoroethanol, m-creosol, etc. at 25° C.

Preparation of such polymers is typically illustrated in U.S. Pat. Nos. 2,071,200; 2,071,253; 2,130,948; 2,285,009; 2,361,717; 2,512,606; 3,193,535; and 3,431,236 among others.

Particular polyamides which can be used according to the method of this invention include, among others, polyhexamethylene adipamide, polyhexamethylene sebacamide, polymerized 6-aminocaproic acid, polytetramethylene adipamide, polytetramethylene sebacamide, and polyadipamides prepared from di(4-aminocyclohexyl)ethane or 1,6-di(4-aminocyclohexyl)hexane as the diamine component.

The preferred polyamides used in this invention include: nylon 6, nylon 66, nylon 610, nylon 11 and nylon 12. Another class of preferred polyamides are the mixed aliphatic-aromatic polyamides, such as Trogamid-T (produced by Dynamit Nobel) and Amidel (sold by Union Carbide Corporation). These are commercially available polymers and illustrative methods of the preparation are described in the Encyclopedia of Chemical Technology, vol. 10, pages 924–928, Interscience Publishers, Inc., N.Y.C. (1953). Other polyamides which fall within the ambit of this invention include both those made from amino acids or the corresponding alicyclic lactams as well as those made from salts of diamines and dibasic acids.

Other Ingredients

Other additives may be included in the composition of this invention. These additives include plasticizers; pigments; reinforcing agents, such as glass fibers; thermal stabilizers; ultraviolet light stabilizers, processing aids, flame retardant synergists, such as $Sb_2O_3$ and zinc borate, impact modifiers and the like. The impact modifiers which are particularly suitable for use herein are described in U.S. Pat. No. 4,231,922. These impact modifiers are a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly(isoprene). In each of the polymers there is sufficient butadiene to give the polymer a rubbery character.

The constituents which are grafted onto the unsaturated elastomeric backbone are selected from a vinyl aromatic, such as styrene, α-methylstyrene, alkylstyrene, or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commonly available as impact modifiers for poly(vinyl chloride) as described in, for example, V. Shakaypal, in "Developments in PVC Technology", edited by J. H. L. Hensen and A. Whelan, Applied Science Publishers Ltd., New York, 1973.

The grafted constituents of the impact modifier comprise from about 20 to about 60 percent by weight of said constituents such that their tensile modulus does not exceed about 100,000 psi, and is preferably, between about 15,000 to less than about 100,000 psi.

Preparation

The compositions of this invention are prepared by any conventional mixing methods. For example, a preferred method comprises mixing the polyarylates, flame retardant additive and when used, the thermoplastic polymer(s) in powder or granular form in an extruder and extruding the mixture into strands, chopping the strands into pellets and molding the pellets into the desired article.

EXAMPLES

The following examples serve to give specific illustrations of the practice of this invention but they are not intended in any way to limit the scope of this invention.

The following designations used in the Examples have the following meaning:

Flame retardant 1—2,4,5 trichlorobenzene sulfonic acid K+ salt.

Flame retardant 2—sulfonated 4,4'-dichlorodiphenyl sulfone Na+ salt.

Flame retardant 3—sulfonated 4,4-dichlorodiphenyl sulfone Na+ salt.

Preparation of Flame retardant 2 and Flame retardant 3

60 grams of 4,4'-dichlorodiphenyl sulfone were dissolved in 200 ml. of concentrated sulfuric acid (94–96 percent) and heated to the following temperatures: 2 hours at 200° C. (Flame retardant 2) and 4 hours at 185° C. (Flame retardant 3). After cooling, copious amounts of a saturated sodium chloride solution were slowly added resulting in precipitation of the sulfonated 4,4'-dichlorodiphenyl sulfone Na+ salt. The resultant filter cake was still acidic and was then slurried in methanol to which a sodium hydroxide-methanol concentrated solution was added for neutralization. Two samples were then collected, i.e., a methanol insoluble portion and a methanol soluble portion. Based on thermogravimetric analysis measurements for the most severe sulfonation conditions (>2 hours at 200° C.), the methanol soluble portion contained the sulfonated 4,4'-dichlorodiphenyl Na+ salt. This product is quite stable up to at least 550° C. at which point rapid degradation occurs. Only a minor amount of 4,4'-dichlorodiphenyl sulfone (>2 percent) was present based on both differential scanning colorimetry and thermogravimetric analysis data comparison with 4,4'-dichlorodiphenyl sulfone which would show up as a weight loss much lower than 550° C.

CONTROL A

A polyarylate having a reduced viscosity of 0.64 dl/g as measured in p-chlorophenol at 49° C. (produced by the diacetate process as described, supra and containing 0.15 weight percent of tetrakis [2,4-di-tert-butylphenyl]-4,4'-biphenylene diphosphonite was injection molded in a 1¼ ounce Newbury injection molding machine into samples ⅛×½×5 inches. The samples were subjected to the UL-94 Burning Test for Classifying Materials. The UL-94 ratings of V-0, V-1, or V-2 are determined as designated below:

"94 V-0" No single flaming combustion after removal of the igniting flame shall exceed 10 seconds and none of the specimens shall drip flaming particles which ignite absorbent surgical cotton placed 12 inches below the specimen. Total flame out time for all five specimens (10 ignitions) cannot exceed 50 seconds.

"94 V-1" No single flame combustion after removal of the igniting flame shall exceed 30 seconds and none of the specimens shall drip flaming particles which ignite absorbent surgical cotton placed 12 inches below the specimen. Total flame out time for all five specimens (10 ignitions) cannot exceed 250 seconds.

"94 V-2" No single flaming combustion after removal of the igniting flame shall exceed 30 seconds. The specimens drip flaming particles which burn only briefly, some of which ignite absorbent surgical cotton placed 12 inches below the specimen. Total flame out time for all five specimens (10 ignitions) cannot exceed 250 seconds.

In addition, a test bar which continues to burn for more than 30 seconds after removal of the igniting flame is classified as "burns." Six specimens were utilized for the test data reported instead of the five reported for the test procedure. Specimens of approximately 1/16 inch thickness were subjected to the above described test procedures. These specimens were prepared by compression molding and then cut into ½ inch strips.

EXAMPLE 1

99 weight percent of the polyarylate of Control A was blended with 1 weight percent of Flame retardant 1 in a 1-inch extruder at about 270° C. The blend was then injection molded and tested by the procedure as described in Control A.

The results are shown in Table I.

EXAMPLE 2

98 weight percent of the polyarylate of Control A was blended with 2 weight percent of Flame retardant 1 in a 1-inch extruder at about 270° C. The blend was then injection molded and tested by the procedure as described in Control A.

The results are shown in Table I.

EXAMPLE 3

98 weight percent of the polyarylate of Control A was blended with 2 weight percent of Flame retardant 2 in a 1-inch extruder at about 270° C. The blend was then injection molded and tested by the procedure as described in Control A.

The results are shown in Table I.

dant 2 under the conditions described in Control B. The mixture was then injection molded and tested by the procedure as described in Control A.

The results are shown in Table II.

CONTROL C 90 weight percent of the polyarylate described in Control B was blended with 10 weight percent of the

TABLE 1

| | Description of the Composition | | Thickness of the sample | 1st Ignition* | | 2nd Ignition* | | UL-94 |
|---|---|---|---|---|---|---|---|---|
| Example | Polymer[1] (wt. %) | Additive (wt. %) | (mils) | Burning time (sec) | Flaming drops | Burning time (sec) | Flaming drops | Rating |
| Control A | PA(100) | — | 69 | 15.8 | 0.33 | 17.5 | 1.2 | burns |
| 1 | PA(99) | Flame retardant-1 (1) | 68 | 1.3 | 0 | 2.7 | 0 | V-0 |
| 2 | P(98) | Flame retardant-1 (2) | 69 | 1.0 | 0 | 1.2 | 0 | V-0 |
| 3 | PA(98) | Flame retardant-2 (2) | 68 | 1.2 | 0 | 2.5 | 0 | V-0 |

[1]PA - polyarylate
*Burning time and flaming drops data are an average of six specimens

CONTROL B 75 weight percent of a polyarylate (prepared from Bisphenol-A and a mixture of 50 mole percent of terephthalic acid chloride and 50 mole percent of isophthalic acid chloride by conventional methods) having a reduced viscosity of 0.66 dl/g as measured in p-chlorophenol at 49° C., and 25 weight percent of a poly(ethylene terephthalate) having an intrinsic viscosity of 0.72 as measured in 60:40 phenol/tetrachloroethane at 23° C. were blended in an extruder at about 300° C. The mixture was then injection molded and tested by the procedure as described in Control A.

The results are shown in Table II.

EXAMPLE 4

99 weight percent of the mixture of Control B was blended with 1 weight percent of Flame retardant 1 under the conditions described in Control B. The mixture was then injection molded and tested by the procedure as described in Control A.

The results are shown in Table II.

EXAMPLE 5

99 weight percent of the mixture of Control B was blended with 1 weight percent of Flame retardant 3 under the conditions described in Control B. The mixture was then injection molded and tested by the procedure as described in Control A.

The results are shown in Table II.

EXAMPLE 6

98 weight percent of the mixture of Control B was blended with 2 percent weight percent of Flame retarpoly(ethylene terephthalate) described in Control B under the conditions described in Control B. The mixture was then injection molded and tested by the procedure as described in Control A.

EXAMPLE 7

89 weight percent of the polyarylate described in Control B was blended with 10 weight percent of the poly(ethylene terephthalate) described in Control B and 1 weight percent of Flame retardant 1 under the conditions described in Control B. The mixture was then injection molded and tested by the procedure as described in Control A.

CONTROL D 70 weight percent of the polyarylate described in Control B was blended with 30 weight percent of an aromatic bisphenol-A polycarbonate (Lexan 101 sold by General Electric Company) having a reduced viscosity of 0.64 as measured in chloroform at 25° C. under the conditions described in Control B. The mixture was then injection molded and tested by the procedure as described in Control A.

The results are shown in Table II.

EXAMPLE 8

69 weight percent of the polyarylate described in Control B, 30 weight percent of the polycarbonate described in Control D, and 1 weight percent of Flame retardant 1 were blended under the conditions described in Control B. The mixture was then injection molded and tested by the procedure as described in Control A.

The results are shown in Table II.

TABLE II

| | Description of the Composition | | Thickness of the sample | 1st Ignition* | | 2nd Ignition* | | UL-94 |
|---|---|---|---|---|---|---|---|---|
| Example | Polymer[1] (wt. %) | Additive (wt. %) | (mils) | Burning time (sec) | Flaming drops | Burning time (sec) | Flaming drops | Rating |
| Control B | PA(75) PET(25) | — | 113 | 6 | 0 | 12.5 | 0.67 | V-2 |
| 4 | PA(75) 99 PET(25) | Flame retardant-1 (1) | 115 | 2.2 | 0 | 9 | 0 | V-1 |
| 5 | PA(75) 99 PET(25) | Flame retardant-3 (1) | 115 | 1.8 | 0 | 5.7 | 0 | V-1 |
| 6 | PA(75) 98 PET(25) | Flame retardant-3 (1) | 115 | 1.2 | 0 | 3.2 | 0 | V-0 |
| Control C | PA(90) PET(10) | — | 69 | 2.8 | 0 | 16.8 | 1.3 | V-2 |
| 7 | PA(89) PET(10) | Flame retardant-1 (1) | 69 | 2.7 | 0 | 6.5 | 0.5 | V-2 |

TABLE II-continued

| Example | Description of the Composition Polymer[1] (wt. %) | Additive (wt. %) | Thickness of the sample (mils) | 1st Ignition* Burning time (sec) | Flaming drops | 2nd Ignition* Burning time (sec) | Flaming drops | UL-94 Rating |
|---|---|---|---|---|---|---|---|---|
| Control D | PA(70) PC(30) | — | 69 | 2.8 | 0 | 11.0 | 0.7 | V-2 |
| 8 | PA(69) PC(30) | Flame retardant-1 (1) | 69 | 1 | 0 | 1.5 | 0 | V-0 |

[1]PA - polyarylate
PET - poly(ethylene terephthalate)
PC - polycarbonate
*- Burning time and flaming drops data are an average of six specimens

CONTROL E

The polycarbonate described in Control D was compression molded and tested by the procedure as described in Control A.

The results are shown in Table III.

CONTROL F

The polyarylate described in Control B was compression molded and tested by the procedure as described in Control A.

The results are shown in Table III.

CONTROL G 99 weight percent of the polycarbonate described in Control D was blended with 1 weight percent of Flame retardant 1 under the conditions described in Control B. The mixture was then compression molded into a 67 mil thick test bar and tested by the procedure described in Control A.

The results are shown in Table III.

CONTROL H

Control G was exactly repeated except that the blend was injection molded into a 119 mil thick test bar.

The results are shown in Table III.

EXAMPLE 9

99 weight percent of the polyarylate described in Control B was blended with 1 weight percent of Flame retardant 1 under the conditions described in Control B. The mixture was then compression molded into a 69 mil thick test bar and tested by the procedure as described in Control A.

The results are shown in Table III.

EXAMPLE 10

Example 9 was exactly repeated except that the blend was injection molded into a 122 mil thick test bar.

The results are shown in Table III.

CONTROL I 80 weight percent of the polyarylate described in Control B was blended with 20 weight percent of the poly(ethylene terephthalate) described in Control B were blended under the conditions described in Control B. The mixture was then compression molded into a 68 mil thick test bar and tested by the procedure as described in Control A.

CONTROL J

Control I was exactly repeated except that the blend was injection molded into a 120 ml thick test bar.

The results are shown in Table III.

EXAMPLE 11

99 weight percent of the blend described in Control H was blended with 1 weight percent of Flame retardant 1 under the conditions as described in Control B. The mixture was then compression molded into a 67 mil thick test bar and tested by the procedure as described in Control A.

The results are shown in Table III.

EXAMPLE 12

Example 11 was exactly repeated except that the blend was injection molded into a 121 mil thick test bar. The results are shown in Table III.

CONTROL K 80 weight percent of the polycarbonate of Control D was blended with 20 weight percent of the poly(ethylene terephthalate) described in Control B and 1 weight percent of Flame retardant 1 under the conditions as described in Control B. The mixture was then compression molded into a 68 mil thick test bar and tested by the procedure as described in Control A.

The results are shown in Table III.

CONTROL L

Control K was exactly repeated except that the blend was injection molded into a 119 mil thick test bar.

The results are shown in Table III.

The data in Table III shows that the flame retardant yields similar results in polyarylates and polycarbonates. However, when a polyester, i.e., poly(ethylene terephthalate) is added in equal amounts to a polyarylate and polycarbonate, the flame retardant additive is only effective in the polyarylate/poly(ethylene terephthalate) mixture.

TABLE III

| Example | Description of the Composition Polymer[1] (wt. %) | Additive (wt. %) | Thickness of the sample (mils) | 1st Ignition* Burning time (sec) | Flaming drops | 2nd Ignition* Burning time (sec) | Flaming drops | UL-94 Rating |
|---|---|---|---|---|---|---|---|---|
| Control E | PC(100) | — | 68 | 31 | 1.7 | 24 | 2.0 | burns |
| Control F | PA(100) | — | 68 | 2.5 | 0 | 6 | 0 | V-0 |
| Control G | PC(99) | Flame retardant-1 (1) | 67 | 2 | 0 | 3 | 0 | V-0 |
| Control H | PC(99) | Flame retardant-1 (1) | 119 | 1 | 0 | 2.5 | 0 | V-0 |
| 9 | PA(99) | Flame retardant-1 (1) | 69 | 2.3 | 0 | 4.6 | 0 | V-0 |
| 10 | PA(99) | Flame retardant-1 (1) | 122 | 1 | 0 | 1.7 | 0 | V-0 |
| Control I | PA(80) | — | 68 | 13 | 0.8 | 7.2 | 1.3 | V-2 |

TABLE III-continued

| Example | Description of the Composition Polymer[1] (wt. %) | Additive (wt. %) | Thickness of the sample (mils) | 1st Ignition* Burning time (sec) | 1st Ignition* Flaming drops | 2nd Ignition* Burning time (sec) | 2nd Ignition* Flaming drops | UL-94 Rating |
|---|---|---|---|---|---|---|---|---|
| Control J | PET(20) PA(80) | — | 120 | 3 | 0 | 14.5 | 0.5 | V-2 |
| 11 | PET(20) PA(80) 99 | Flame retardant-1 (1) | 67 | 7.5 | 0 | 6.8 | 1.5 | V-2 |
| 12 | PET(20) PA(80) 99 | Flame retardant-1 (1) | 121 | 2.5 | 0 | 8.2 | 0 | V-1 |
| Control K | PET(20) PC(80) 99 | Flame retardant-1 (1) | 68 | >28 | 4.7 | — | — | burns |
| Control L | PET(20) PC(80) 99 | Flame retardant-1 (1) | 119 | 16 | 0 | 22.7 | 1 | burns |

[1]PC - polycarbonate
PA - polyarylate
PET - poly(ethylene terephthalate)
*- Burning time and flaming drops data are an average of six specimens

CONTROL M 70 weight percent of the polyarylate described in Control B, 20 weight percent of the polycarbonate described in Control D and 10 weight percent of the poly(ethylene terephthalate) described in Control B were blended under the conditions described in Control B. The mixture was then injection molded and tested by the procedure as described in Control A.

The results are shown in Table IV.

EXAMPLE 13

69 weight percent of the polyarylate described in Control B, 20 weight percent of the polycarbonate described in Control D, 10 weight percent of the poly(ethylene terephthalate) described in Control B, and Flame retardant 1 were blended under the conditions described in Control B. The mixture was then injection molded and tested by the procedure as described in Control A.

The results are shown in Table IV.

EXAMPLE 14

77 weight percent of the polyarylate described in Control B, 20 weight percent of the poly(ethylene terephthalate) described in Control B, 2 weight percent of decabromodiphenyl oxide, and 1 weight percent of Flame retardant 1 were blended under the conditions described in Control B. The mixture was then injection molded and tested by the procedure as described in Control A.

The results are shown in Table IV.

The data in the Tables show that the flame retardants of this invention are efficient in polyarylates and polyarylate blends. In particular, their efficiency is outstanding in polyarylate blends with readily combustible materials, such as poly(ethylene terephthalate). In these latter blends, the additives are unexpectedly more effective then in similar blends where the polyarylate is replaced by polycarbonate.

TABLE IV

| Example | Description of the Composition Polymer[1] (wt. %) | Additive (wt. %) | Thickness of the sample (mils) | 1st Ignition* Burning time (sec) | 1st Ignition* Flaming drops | 2nd Ignition* Burning time (sec) | 2nd Ignition* Flaming drops | UL-94 Rating |
|---|---|---|---|---|---|---|---|---|
| Control M | PA(70) PC(20) PET(10) | — | 68 | 45 | 2 | 26 | 3 | burns |
| 13 | PA(69) PET(20) PET(10) | Flame retardant-1 (1) | 67 | 4.2 | 0 | 8.7 | 1.2 | V-2 |
| Control N | PA(78) PET(20) | Decabromodiphenyl oxide (2) | 67 | 2.7 | 0 | 7.7 | 1 | V-2 |
| 14 | PA(77) PET(20) | Decabromodiphenyl oxide (2) Flame retardant-1 (1) | 67 | 2.7 | 0 | 3.5 | 0.8 | V-2 |

[1]PA - polyarylate
PC - polycarbonate
PET - poly(ethylene terephthalate)
*- Burning time and flaming drops data are an average of six specimens

CONTROL N 78 weight percent of the polyarylate described in Control B, 20 weight percent of the poly(ethylene terephthalate) described in Control B, and 2 weight percent of decabromodiphenyl oxide were blended under the conditions described in Control B. The mixture was then injection molded and tested by the procedure as described in Control A.

The results are shown in Table IV.

What is claimed is:

1. A flame retardant molding composition comprising a blend of:
   (a) a polyarylate derived from a dihydric phenol and an aromatic dicarboxylic acid, and
   (b) a flame retarding amount of an alkali or alkaline earth metal salt of an aromatic sulfonic acid.
2. A composition as defined in claim 1 wherein the dihydric phenol is of the formula:

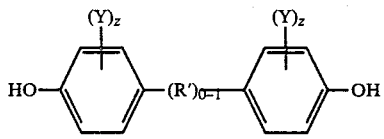

wherein Y is selected from alkyl groups of 1 to 4 carbon atoms, chlorine or bromine, each z, independently, has a value of from 0 to 4, inclusive, and R' is a divalent saturated or unsaturated aliphatic hydrocarbon radical selected from alkylene and alkylidene radicals having from 1 to 3 carbon atoms, and cycloalkylene or cycloalkylidene radicals having up to and including 9 carbon atoms.

3. A composition as defined in claim 2 wherein each z is 0 and R' is an alkylidene radical of 3 carbon atoms.

4. A composition as defined in claim 1 wherein the aromatic dicarboxylic acid is a mixture of isophthalic and terephthalic acids.

5. A molding composition as defined in claim 1 wherein the metal salt of the aromatic sulfonic acid is selected from an alkali or an alkaline earth metal salt of sulfonic acids of aromatic sulfones, cycloaliphatically substituted aromatic sulfonic acids, heterocyclic aromatic sulfonic acids, sulfonic acids of aromatic ketones, either monomeric or polymeric aromatic sulfonic acids, either monomeric or polymeric aromatic ether sulfonic acids, monomeric and polymeric carboxy or ester substituted aromatic sulfonic acids, either monomeric or polymeric phenol ester sulfonic acids, sulfonic acids of aromatic sulfoxides, and mixtures thereof.

6. A composition as defined in claim 5 wherein the metal salt is substituted by an electron withdrawing radical.

7. A composition as defined in claim 6 wherein the electron withdrawing radical is a halo, nitro, trihalomethyl or cyano radical.

8. A composition as defined in claims 1 or 5 wherein the metal salt of the aromatic sulfonic acid is of the following formula:

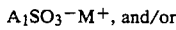

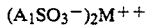

wherein $A_1$ is a substituted or unsubstituted aromatic monomeric or polymeric radical containing at least 6 carbon atoms, $M^+$ is an alkali metal ion and $M^{++}$ is an alkaline earth metal ion.

9. A composition as defined in claim 8 wherein the substituent on the substituted aromatic radical is an electron withdrawing radical selected from halo, nitro, trifluromethyl or cyano radicals.

10. A composition as defined in claim 8 wherein $A_1$ is selected from the following formulae:

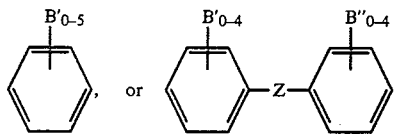

wherein Z is selected fron a direct bond, O, CO, S, $SO_2$ or $OSO_2$ and B' and B" are independently chlorine, bromine, fluorine, trihalomethyl, cyano or nitro.

11. A composition as defined in claims 1 or 8 wherein the metal salt of the aromatic sulfonic acid is selected from the following formula:

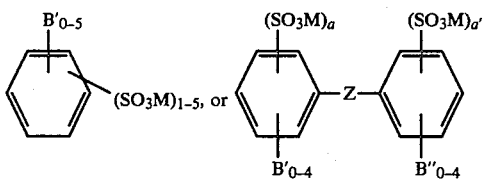

wherein Z is selected from a direct bond, O, CO, S, $SO_2$ or $OSO_2$ and B' and B" are independently chlorine, bromine, fluorine, trihalomethyl, cyano or nitro, M is an alkali metal ion and a and a' are independently 0–4 with the proviso that at least one of a or a' is 1.

12. A composition as defined in claim 11 wherein the metal salt of the aromatic sulfonic acid is of the following formula:

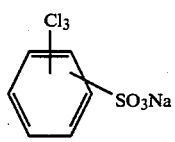

13. A composition as defined in claim 11 wherein the metal salt of the aromatic sulfonic acid is of the following formula:

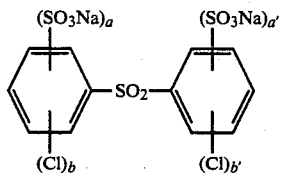

wherein a, a', b and b' are independently 0 to 4 with the proviso that at least one of a and a' and b and b' is 1.

14. A composition as defined in claim 11 wherein the metal salt of the aromatic sulfonic acid is of the following formula:

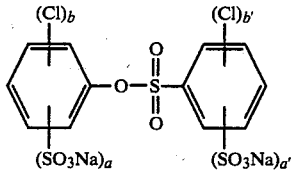

wherein a, a', b and b' are independently 0 to 4 with the proviso that at least one of a and a' and b and b' is 1.

15. A composition as defined in claim 1 wherein the composition contains a metal salt of an aliphatic sulfonic acid or a halogen source selected from an inorganic halide, or a halogenated alkali metal salt or an alkaline earth metal salt of aliphatic, aromatic or cycloaliphatic carboxylic or sulfonic acids.

16. A composition as defined in claims 1 or 5 or 8 wherein the metal salt of the aromatic sulfonic acid is present in amounts of from about 0.05 to about 10 weight percent.

17. A composition as defined in claims 1 or 5 or 8 wherein the composition contains decabromodiphenyl oxide.

18. A composition as defined in claim 1 which contains a thermoplastic polymer selected from the group consisting of a polyester, a styrene polymer, a polyalkyl acrylate polymer, a polyurethane, a vinyl chloride polymer, a poly(aryl ether), a copolyetherester block copolymer, a polyhydroxyether, a polyamide and combinations thereof.

19. A composition as defined in claim 18 wherein the thermoplastic polymer is a polyester.

20. A composition as defined in claim 19 wherein the polyester has repeating units of the general formula:

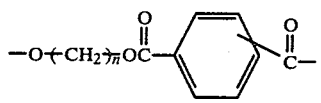

wherein n is an integer of from 2 to 4.

21. A composition as defined in claim 20 wherein the polyester is poly(ethylene terephthalate).

22. A composition as defined in claim 19 wherein the polyester has recurring units of the following formula:

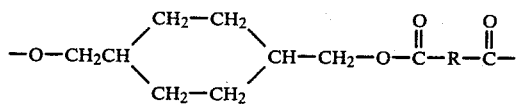

wherein the cyclohexane ring is selected from the cis- and trans-isomers thereof and R represents an aryl radical containing 6 to 20 carbon atoms and which is the decarboxylated residue derived from an aromatic dicarboxylic acid.

23. A composition as defined in claim 22 wherein the polyester has recurring units of the following formula:

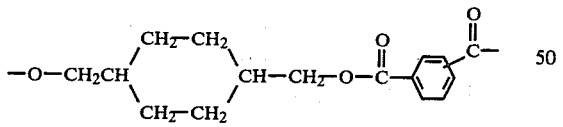

24. A composition as defined in claim 19 wherein the polyester has recurring units of the following formula:

25. A composition as defined in claim 24 wherein the polyester has repeating units of the following formula:

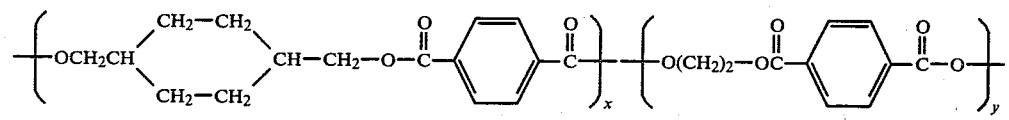

26. A composition as defined in claim 1 which contains from about 10 to about 50 parts by weight of an aromatic polycarbonate.

27. A composition as defined in claim 26 wherein the aromatic polycarbonate is the reaction product of a dihydric phenol and a carbonate precursor.

28. A composition as defined in claim 27 wherein the dihydric phenol is bisphenol-A and the carbonate precursor is carbonyl chloride.

29. A composition as defined in claim 18 wherein the thermoplastic polymer is a styrene polymer.

30. A composition as defined in claim 29 wherein the styrene polymer is prepared by polymerizing a conjugated diene monomer or a conjugated diene monomer with a monomer copolymerizable therewith or an acrylic acid ester to provide an elastomeric backbone and thereafter grafting at least one grafting styrene monomer onto said backbone.

31. A composition as defined in claim 30 wherein the conjugated diene monomer is butadiene and the grafting monomer is selected from styrene, an acrylonitrile, an acrylic acid ester, or mixtures thereof.

32. A composition as defined in claim 31 wherein the styrene resin is a butadiene/styrene/acrylonitrile resin.

33. A composition as defined in claim 18 wherein the thermoplastic polymer is a poly(alkyl acrylate) polymer.

34. A composition as defined in claim 33 wherein the poly(alkyl acrylate) is poly(methyl methacrylate).

35. A composition as defined in claim 33 wherein the poly(alkyl acrylate) is a copolymer of methyl methacrylate and a vinyl monomer wherein the amount of methyl methacrylate is greater than about 70 percent by weight of the copolymer.

36. A composition as defined in claim 35 wherein the vinyl monomer is selected from acrylonitrile, N-allylmaleimide, vinyl chloride, N-vinylmaleimide or an alkyl acrylate or methacrylate with the exclusion of methyl methacrylate, wherein the alkyl group contains from 1 to 8 carbon atoms.

37. A composition as defined in claim 33 wherein the poly(alkyl acrylate) is an alkyl acrylate grafted onto an unsaturated elastomeric backbone, wherein the alkyl acrylate comprises greater than about 50 weight percent of the graft copolymer formed.

38. A composition as defined in claim 18 wherein the

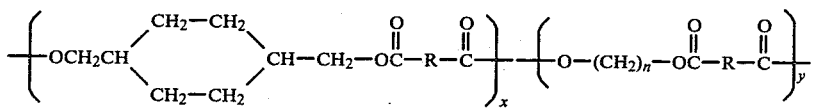

wherein the cyclohexane ring is selected from the cis- and trans-isomers thereof, R is as previously defined, n is an integer of 2 to 4, the x units comprise from about 10 to about 90 percent by weight and the y units comprise from about 10 to about 90 percent by weight.

thermoplastic polymer is a polyurethane.

39. A composition as defined in claim 38 wherein the polyurethane is derived from a polyester resin having a molecular weight of at least about 600, an organic diisocyanate, and a low molecular weight chain extender having active hydrogen containing groups which are reactive with the diisocyanate.

40. A composition as defined in claim 38 wherein the polyurethane is derived from a polyether, an organic diisocyanate, and a low molecular weight chain extender having active hydrogen containing groups which are reactive with the diisocyanate.

41. A composition as defined in claim 40 wherein the polyether is selected from polytetramethylene glycol having an average molecular weight between about 600 and about 2000, polypropylene glycol, and polyethylene glycol having a molecular weight above about 600.

42. A composition as defined in claim 18 wherein the thermoplastic polymer is a poly(vinyl chloride) polymer.

43. A composition as defined in claim 42 wherein the poly(vinyl chloride) polymer is a copolymer of vinyl chloride with an olefinically unsaturated polymerizable compound which contains at least about 80 percent by weight of vinyl chloride incorporated therein.

44. A composition as defined in claim 18 wherein the thermoplastic polymer is a poly(aryl ether).

45. A composition as defined in claim 44 wherein the poly(aryl ether) comprises recurring units of the formula:

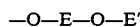

wherein E is the residuum of a dihydric phenol and E' is the residuum of a benzenoid compound having an inert electron withdrawing group.

46. A composition as defined in claim 45 wherein the poly(aryl ether) has recurring units having the formula:

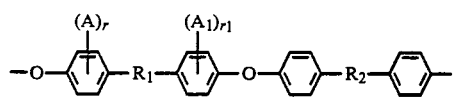

A and $A_1$ can be the same or different inert substituent groups and are selected from alkyl groups having from 1 to 4 carbon atoms, fluorine, chlorine, bromine, iodine, or alkoxy radicals having from 1 to 4 carbon atoms, $R_1$ represents a bond between aromatic carbon atoms or a divalent connecting radical, $R_2$ is sulfone, carbonyl or sulfoxide, r and $r_1$ are integers having a value of from 0 to 4, inclusive.

47. A composition as defined in claim 46 wherein r and $r_1$ are O, $R_2$ is $SO_2$, and $R_1$ is the following

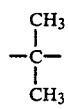

48. A composition as defined in claim 18 wherein the thermoplastic polymer is a copolyetherester block copolymer.

49. A composition as defined in claim 48 wherein the copolyetherester block copolymer has a multiplicity of recurring intralinear long chain and short chain ester units connected head-to-tail through ester linkages, said long chain ester units being represented by the following structure:

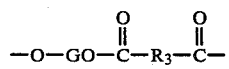

and said short chain ester units being represented by the following structure

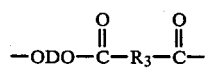

wherein G is a divalent radical remaining after removal of terminal hydroxy groups from a poly(alkylene oxide) glycol having a molecular weight of from about 400 to about 3500, D is a divalent radical remaining after removal of hydroxyl groups from a low molecular weight diol, and $R_3$ is a divalent radical remaining after removal of carboxyl groups from a dicarboxylic acid; with the provisos that the short chain ester units constitute from about 25 to 65% by weight of the copolyester, at least about 70% of the $R_3$ groups are 1,4-phenylene radicals, at least about 70% of the D groups are 1,4-butylene radicals, and the sum of the percentages of the $R_3$ groups which are not 1,3-phenylene radicals and of the D groups which are not 1,4-butylene radicals do not exceed about 30%.

50. A composition as defined in claim 18 wherein the thermoplastic polymer is a polyhydroxyether.

51. A composition as defined in claim 50 wherein the polyhydroxyether has the general formula

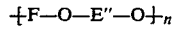

wherein F is the radical residuum of a dihydric phenol, E" is a radical residuum of an epoxide selected from mono- and diepoxides containing from 1 to 2 hydroxyl groups and n is an integer which represents the degree of polymerization and is at least about 30.

52. A composition as defined in claim 51 wherein the polyhydroxyether is derived from the reaction of bisphenol A and epichlorohydrin.

53. A composition as defined in claim 18 wherein the thermoplastic polymer is a polyamide.

54. A composition as defined in claim 53 wherein the polyamide is selected from nylon 6, nylon 66, nylon 610, nylon 11 and nylon 12.

55. A composition as defined in claim 53 wherein the polyamide is a mixed aliphatic-aromatic polyamide.

* * * * *

UNITED STATES PATENT AND TRADEMARK OFFICE
CERTIFICATE OF CORRECTION

PATENT NO. : 4,380,598
DATED : April 19, 1983
INVENTOR(S) : L. M. Robeson
M. Matzner It is certified that error appears in the above—identified patent and that said Letters Patent is hereby corrected as shown below:

In column 19, line 53, after "2" delete "percent".

In Table IV, columns 23 and 24, Example 13 under the heading "Polymer" delete "PET(20)" and insert ---PC(20)---.

Signed and Sealed this

Twenty-fourth Day of January 1984

[SEAL]

Attest:

GERALD J. MOSSINGHOFF

Attesting Officer  Commissioner of Patents and Trademarks